United States Patent [19]
Bonerb

[11] Patent Number: 6,019,432
[45] Date of Patent: Feb. 1, 2000

[54] SYSTEM FOR DEPLOYING BULK CONTAINERS IN CARGO TRANSPORT VEHICLES

[76] Inventor: Vincent C. Bonerb, 8626 Back Creek Rd., Boston, N.Y. 14025

[21] Appl. No.: 08/556,507

[22] Filed: Nov. 13, 1995

[51] Int. Cl.⁷ ...................................................... B60P 1/056
[52] U.S. Cl. ........................... 298/24; 105/243; 105/359; 222/105
[58] Field of Search ..................................... 105/243, 359; 222/95, 105, 200, 203, 386.5, 460; 296/10; 298/24, 27, 28; 414/496, 497, 500, 506, 516, 560, 561; 187/252, 256, 259, 272

[56] References Cited

U.S. PATENT DOCUMENTS

| | | | |
|---|---|---|---|
| 2,265,891 | 12/1941 | Bertelsen | 187/256 X |
| 3,061,120 | 10/1962 | Barnett | 187/259 X |
| 3,482,716 | 12/1969 | Leadley | 414/543 |
| 4,005,784 | 2/1977 | Wilson | 414/500 X |
| 4,421,250 | 12/1983 | Bonerb et al. | 222/95 |
| 4,497,259 | 2/1985 | Titterton | 105/243 X |
| 4,534,596 | 8/1985 | Bonerb | 298/27 |
| 4,541,765 | 9/1985 | Moore | 222/105 X |
| 4,557,400 | 12/1985 | Clarke | 298/24 X |
| 4,610,594 | 9/1986 | Lane | 187/252 X |
| 4,645,406 | 2/1987 | Cooper et al. | 414/500 |
| 4,678,389 | 7/1987 | Bonerb | 414/267 |
| 4,735,457 | 4/1988 | Bonerb et al. | 105/243 X |
| 4,867,627 | 9/1989 | Tseng | 187/259 X |

FOREIGN PATENT DOCUMENTS

| | | | |
|---|---|---|---|
| 5-270799 | 10/1993 | Japan | 187/256 |
| 419472 | 3/1974 | U.S.S.R. | 187/272 |

Primary Examiner—Janice L. Krizek
Assistant Examiner—M. Ennis
Attorney, Agent, or Firm—Rothwell, Figg, Ernst & Kurz

[57] ABSTRACT

A system for a freight vehicle having a cargo space convertible for handling bulk cargo as well as piece goods, for deploying bulk cargo containers, includes a cable winding shaft positioned adjacent one end wall of the vehicle, with a cable winding reel mounted on each end of the shaft. The shaft is turned either by an electric motor or a hydraulic or pneumatic motor using the hydraulic or pneumatic system of the tractor that pulls the freight vehicle. Cables are run from the retainer rings of the bulk cargo bags upward against the side walls of the vehicle and then along the roof of the vehicle to the winding reels. According to another embodiment, the lifting mechanism for the bags is a hydraulic or pneumatic ram assembly which uses the hydraulics or pneumatics of the tractor for operation. The ram assembly is mounted externally under the floor of the freight vehicle and the cables are run through openings in the vehicle to the ram assembly.

18 Claims, 5 Drawing Sheets

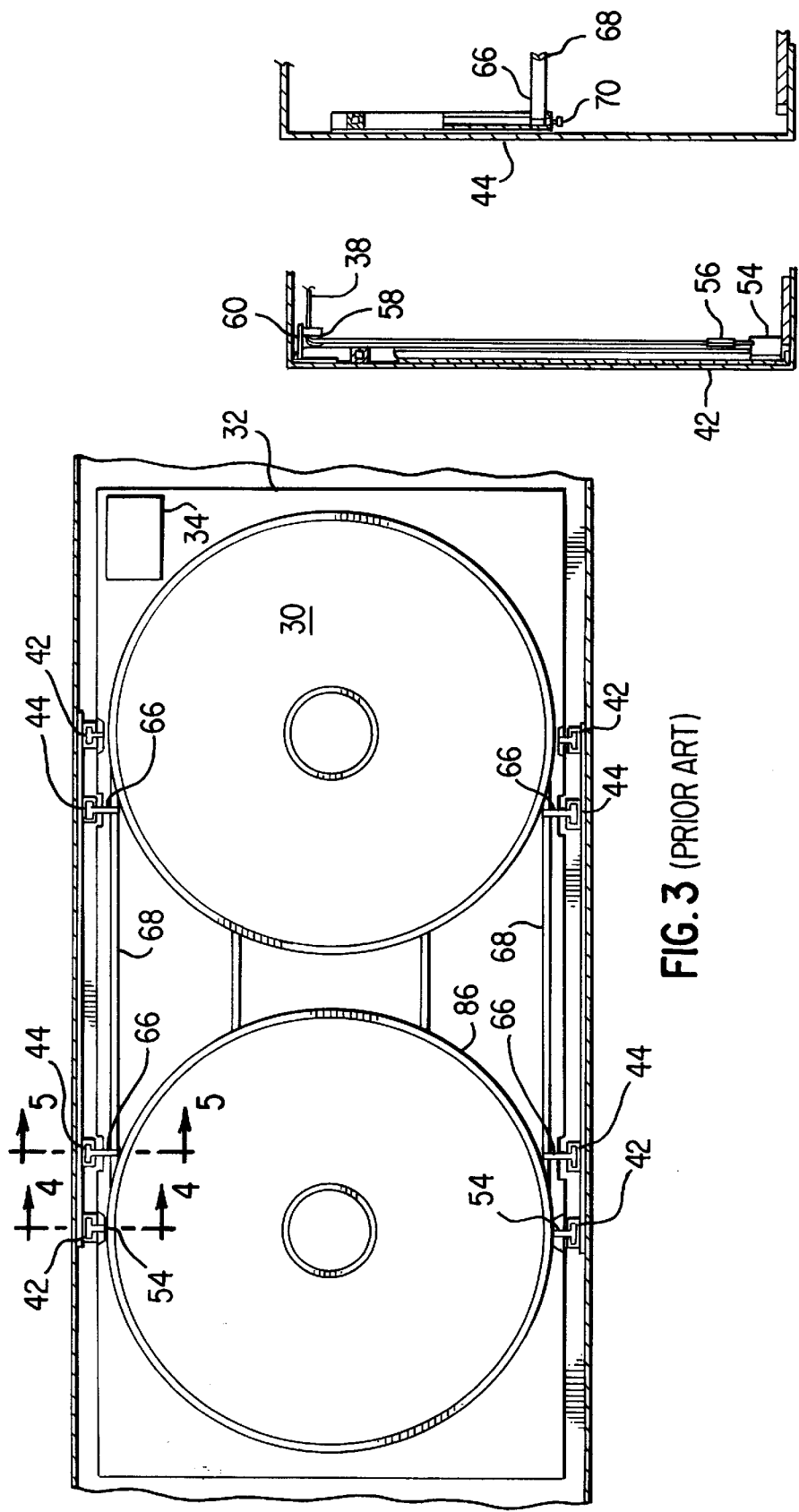

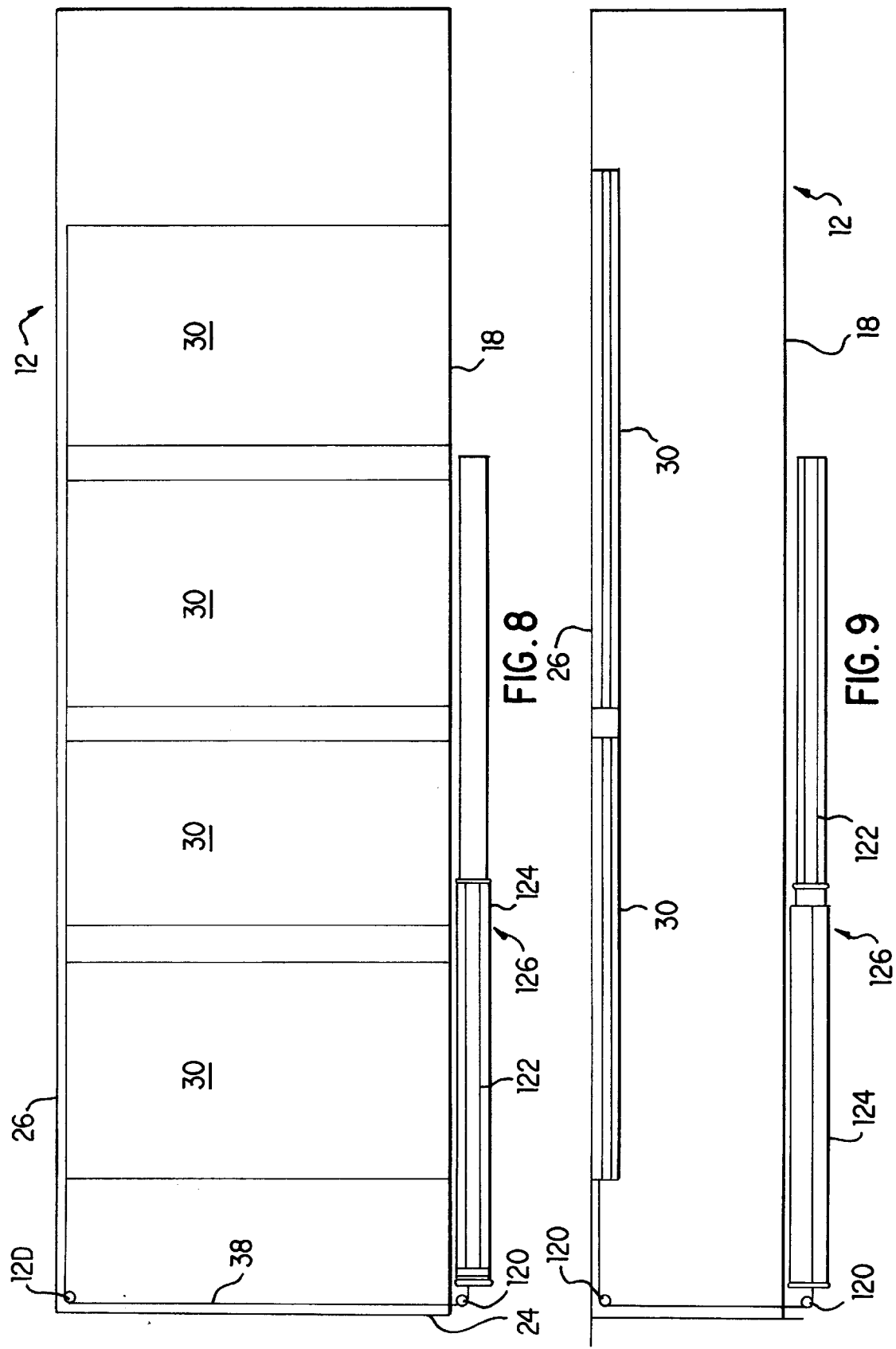

SYSTEM FOR DEPLOYING BULK CONTAINERS IN CARGO TRANSPORT VEHICLES

BACKGROUND OF THE INVENTION

1. Field of the Invention

This invention relates generally to freight vehicles and more particularly to freight vehicles having a cargo space which is convertible between handling piece goods and handling bulk goods, such as granular, powder, flake or fluid material.

2. Prior Art

Freight vehicles which can handle either piece goods or bulk goods are generally known. The advantage of such convertibility is that the same cargo space on the same vehicle could handle either of these two significantly different types of loads. The term "piece goods" is defined herein to mean any goods which are handled as individual items or pieces, including packaged goods or palletized goods. The term "bulk goods" means any goods which are pourable and commonly shipped in bulk, such as powder, grain, flake or fluid materials. The term "freight vehicle" encompasses any vehicle capable of containing freight or cargo, including without limitation tractor-trailers, railway cars, ships, and aircraft.

For example, U.S. Pat. No. 4,534,596, issued Aug. 13, 1985, incorporated in its entirety by reference herein, discloses a freight vehicle having a conventional cargo space for piece goods, wherein the cargo space includes openings in the roof and floor for filling and discharging bulk material. Specially constructed bulk material container bags are deployed from the roof under the inlet openings and extend to the floor over the outlet openings. The bags are filled with bulk material through the inlet openings in the roof, and when the vehicle has arrived at the shipment destination the material is discharged from the outlet openings in the floor. To allow handling of piece goods, the bags are retractable to a stored and locked position on the ceiling of the cargo space.

FIGS. 1–5 illustrate the details of the prior art freight vehicle with convertible cargo space as discussed above. FIG. 1 shows a side view and FIG. 2 shows a top view of the vehicle. As shown in FIGS. 1 and 2, a freight vehicle in the form of a semi-trailer 12 has wheels 14 for transport over a roadway R and a ground support member 16. Trailer 12 has a floor 18, side walls 20 and 22, a front-end wall 24, a rear-end wall 28, and a roof 26. Rear-end wall 28 may contain access doors 25.

A plurality of bulk cargo bags 30 are provided in the trailer 12 for the storage and transportation of bulk goods. Each pair of bags is positioned on a rigid bottom support platform 32. The bags 30 each include a fill cap arrangement 96 located in the inlet opening in the roof 26 of the trailer (and also corresponding discharge cap arrangements located in the floor openings, not shown). Bags 30 can be any suitable type of foldable or retractable bulk cargo container, and are preferably double wall inflatable bags which discharge their loads first by gravity and then by pneumatically assisted gravity discharge. The bags are inflated by conventional blowers 34. See U.S. Pat. No. 4,421,250 for a detailed disclosure of the bags 30.

A plurality of cables 38 extend upward from each platform 32 to the top of the cargo space and then across to a pulley box 40. A winch 36 is provided for winding and unwinding the cables 38 to raise and lower the platforms 32 between the roof and floor of the trailer, and thus deploy and retract the bags 30. Platform guide posts 42 are positioned against the side walls of the trailer and provide vertical guide channels as shown in FIG. 3. A center post 52 is provided against one side wall to provide support for the winch 36 via a cross beam 51. T-shaped guide members 54 extend from each platform 32 and ride within the vertical channels of the guide posts 42 to guide the platforms as they are raised via cables 38. Vertical beams 50 may be provided to compartmentalize pallets P which may be stored in the center of the trailer between two bags. As shown in FIG. 4, each cable 38 is connected to the platform via a connection such as turnbuckle 56 and extends upwardly over a pulley 58 held by a pulley bracket 60, to the pulley box 40. As shown in FIGS. 3 and 5, an angle member 68 is provided between adjacent bags and attached to bag retainer rings 86. Additional T-shaped guide members 66 extend from members 68 and have their heads within vertical channels of guide post members 44. An adjustable stop 70 is provided to limit the downward extension of the guide rings 86.

In operation, when it is necessary to transport bulk material, the winch 36 is activated to deploy the bags 30 through the unwinding of the cables 38. The bags are filled with the bulk material, and are emptied at the destination location. At that time, the winch 36 is activated to retract the bags for stowage adjacent the roof, in order that piece goods may then be loaded into the trailer.

A shortcoming in the above-described prior art convertible freight vehicle is the relative complexity of the deployment system for the bulk cargo bags. Although any conventional cargo vehicle may be converted to a convertible piece/bulk goods vehicle by simply providing openings in the roof and floor of the vehicle, the installation of the prior art retractable cargo bag system is expensive and time-consuming. This is caused by the combination of the winch 36 and cables 38 which are carried to the winch via a complex system of pulleys and associated support and housing members, which must be installed in the trailer, and the fact that a plurality of guide posts and support posts also must be installed on the side walls of late model thin-walled trailers, to provide the support for the winch and the guide channels for the bottom support platforms.

Additionally, repeated raising and lowering operations subject the cables and pulleys to excessive wear and tear, which reduces the useful life of the system. Furthermore, the presence of the side wall guide posts, the winch, the pulley boxes, and the cables which must cross over the top of the cargo space to connect up to the winch 36 (see FIG. 2) significantly reduces the cargo carrying area of the cargo space for handling piece goods, which results in a decrease in the efficiency of the trailer when used to haul palletized cargo.

There thus exists a need in the art to improve upon and simplify the system for actuating the bulk cargo bags in a bulk cargo convertible freight vehicle.

SUMMARY OF THE INVENTION

This invention provides a freight vehicle having a cargo space convertible for handling bulk cargo as well as piece goods, with an improved system for deploying bulk cargo containers. The improved system according to one preferred embodiment of the present invention includes a cable winding shaft positioned adjacent one end wall of the vehicle, with a cable winding reel mounted on each end of the shaft. The shaft is turned either by an electric motor or a hydraulic or pneumatic motor using the hydraulic or pneumatic system of the tractor that pulls the freight vehicle. Cables are run from the retainer rings of the bulk cargo bags upward against the side walls of the vehicle and then along the roof of the vehicle to the winding reels.

It has been discovered in accordance with the present invention that it is not necessary to provide bottom support platforms for the bulk cargo bags in order to stabilize the bags during transportation, but that the force of gravity is sufficient when the bags are fully loaded with the bulk material to be transported. Accordingly, the side wall guide posts are also eliminated according to the invention, resulting in simplification of the installation of the convertible bulk cargo bag system as well as increasing the useful cargo area for the carrying of piece goods.

According to another preferred embodiment of the invention, the lifting mechanism for the bags is a hydraulic or pneumatic ram assembly which uses the hydraulics or pneumatics of the tractor for operation. The ram assembly is mounted externally under the floor of the freight vehicle and the cables are run through openings in either the end wall or the floor of the vehicle to the ram assembly. This embodiment of the invention has the advantage that no winding of the cables is necessary, since the length of the ram assembly is made to correspond to the internal vertical dimension of the freight vehicle. Full extension of the ram thus will fully retract the cargo bags up to the roof of the vehicle, and the bags may be fully deployed simply by bleeding off the hydraulic or pneumatic pressure.

BRIEF DESCRIPTION OF THE DRAWINGS

The present invention will become more fully understood from the following detailed description and accompanying drawings, in which:

FIG. 3 is a top plan view of a pair of bulk cargo container bags according to the prior art;

FIG. 4 is a sectional view taken along line 4—4 of FIG. 3;

FIG. 5 is a sectional view taken along line 5—5 of FIG. 3;

FIG. 8 is a side view of a convertible freight vehicle including a bulk cargo container deployment system according to a second preferred embodiment of the present invention, illustrating a plurality of bulk cargo container bags being fully deployed;

FIG. 9 is a side view of the convertible freight vehicle of FIG. 8, illustrating the plurality of bulk cargo container bags being fully retracted and locked to the roof of the freight vehicle;

DETAILED DESCRIPTION OF THE PREFERRED EMBODIMENTS

Figure 1:
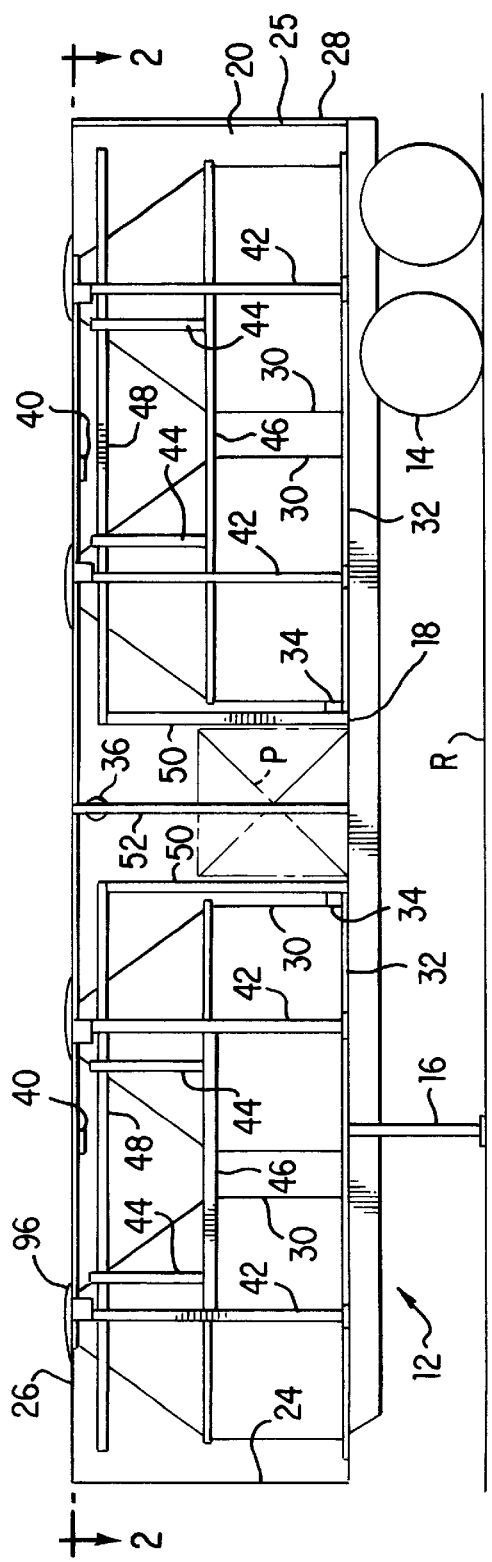
FIG. 1 is a side view of the inside of a convertible cargo space freight vehicle according to the prior art.
Figure 2:
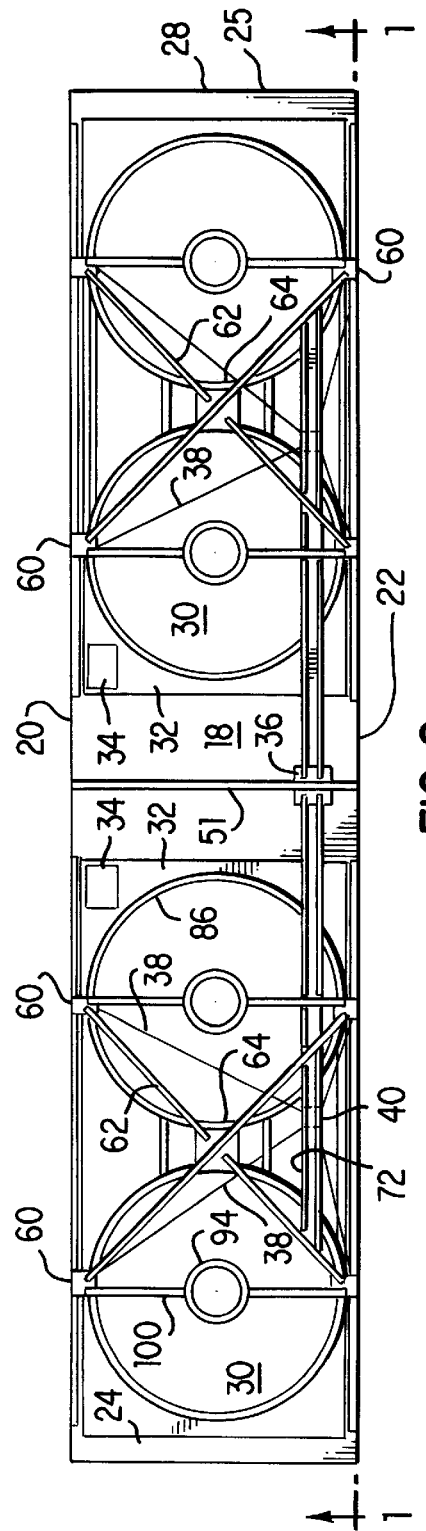
FIG. 2 is a top plan view of the vehicle of FIG. 1.

The present invention will now be described in detail with reference to FIGS. 6–11, wherein like elements with those of FIGS. 1–5 are represented by like reference numerals.

Figure 6:
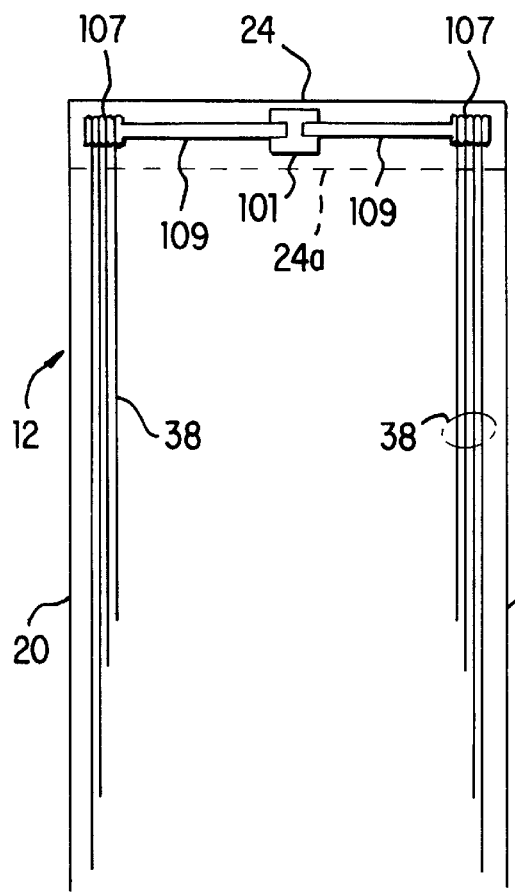
FIG. 6 is a top plan view of a convertible freight vehicle including the bulk cargo container deployment system according to a first preferred embodiment of the present invention.

As shown in FIG. 6, freight vehicle 12 according to the present invention does not require any side wall guide posts 42, because it has been discovered that the bottom support platforms can be eliminated without affecting the stability of the bulk cargo container bags. This is due to the fact that gravity provides a sufficient enough force on fully loaded bags to keep the bags stable in transit.

Figure 7:
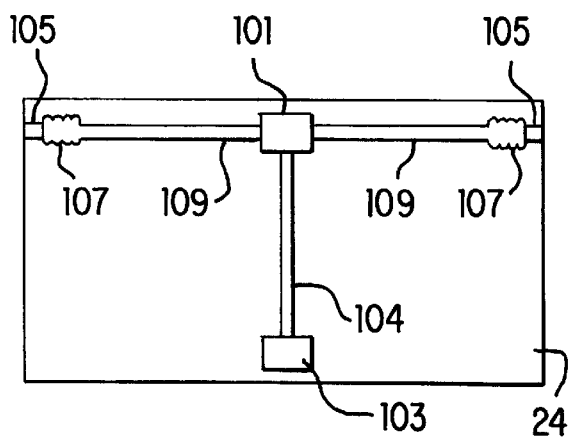
FIG. 7 is an end view of the vehicle shown in FIG. 6.
Figure 11:
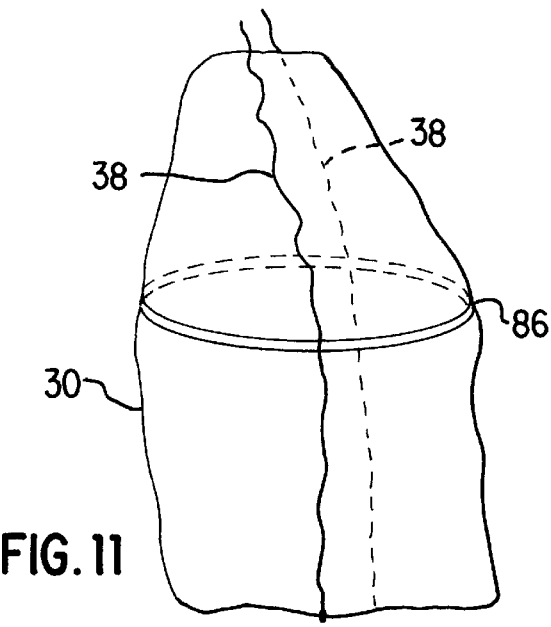
FIG. 11 is a plan view of a bulk cargo container bag 30 according to the present invention.

According to the embodiment of FIGS. 6 and 7, a winding shaft 109 is provided against front end wall 24, with a winding reel 107 provided at each end of the shaft 109 against each side wall 20 and 22, for winding and unwinding the cables 38 which are connected directly to the retainer ring 86 attached to the bag 30, as shown in FIG. 11. Shaft 109 can be rotated by a variety of methods, two of which are shown in FIG. 7. According to one method, a motor 103 is connected via a gear shaft 104 to a gear box 101 for rotating the shaft 109. Alternatively, individual motors 105 with integral gear boxes may be provided for rotating each winding reel 107. Motors 103 and 105 may be any suitable type of motor, including electrical (self-powered or using tractor P.T.O.) or hydraulic.

Each bag 30 is connected to only two cables 38, one of which extends horizontally along the top of side wall 20 and the other of which extends along side wall 22. Incidentally, cables 38 may be implemented by any appropriate type of hoisting lines, such as chains, cables, high tensile wire and the like, so as to retract and deploy the bulk cargo bags and provide sufficient support for fully loaded bags. Accordingly, the necessity for having cables crossing over the roof of the vehicle as shown in the prior art of FIG. 1 is eliminated.

As shown in FIG. 6, the winding shaft 109 and reels 107 may be mounted inside the vehicle against end wall 24 and may be enclosed by a false wall 24a, or alternatively may be mounted on the outside of the end wall 24 within an enclosure.

Figure 10:
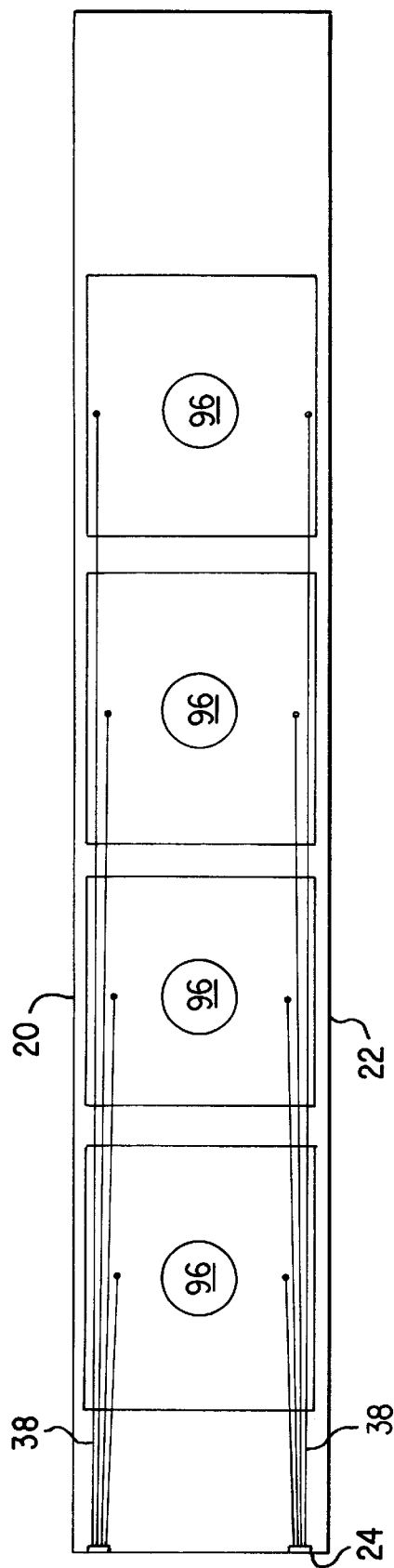
FIG. 10 is a top semi cross-sectional view of the freight vehicle of FIG. 8.

A second preferred embodiment of the invention will now be described with reference to FIGS. 8–10, wherein like elements are denoted by like reference numerals. According to this embodiment, a hydraulic or pneumatic ram assembly 126, including a ram 122 and a housing 124, uses the hydraulics or pneumatics of the tractor (not shown) for operation. For example, hydraulic fluid may be pumped into the housing 124 via a hydraulic reservoir, which will cause the ram 122 to be pushed out of the housing to the position shown in FIG. 9. The hoisting lines or cables 38 are connected to the ram 122, and are drawn back and forth through the motion of the ram within the housing. The ram assembly 126 is mounted externally under the floor 18 of the freight vehicle 12 and the cables 38 are run through openings in either the end wall 24 or the floor 18 of the vehicle to the ram assembly. FIGS. 8–10 show the cables 38 running through openings in the floor 18.

This embodiment of the invention has the advantage that no winding of the cables is necessary, since the length of the ram assembly is made to correspond to the internal vertical dimension of the freight vehicle. Full extension of the ram 122 thus will fully retract the cargo bags up to the roof of the vehicle, as shown in FIG. 9, and the bags may be fully deployed simply by bleeding off the hydraulic or pneumatic pressure within housing 124, causing the ram 122 to retract into the housing by the force of gravity on the bags 30. This is shown in FIG. 8.

It is possible for all of the cables 38 to be connected to a single ram assembly, or to have a separate ram assembly for each group of cables running along one side wall of the cargo space.

Rollers 120 are mounted at the top and bottom of the cargo space of the freight vehicle to provide proper guidance for the path of the cables 38 within the cargo space. FIG. 10 is a top view showing the placement of the cables 38 along the side walls 20 and 22, without any crossover over the roof of the vehicle, thereby significantly increasing the piece goods carrying volume of the cargo space of the vehicle.

The invention having been thus described, it will be apparent to those skilled in the art that the same may be varied in many ways without departing from the spirit and scope of the invention. Any and all such modifications are intended to be covered by the following claims.

What is claimed is:

1. In a freight vehicle having a cargo space convertible from a space suitable for carrying piece goods into a space suitable for carrying bulk goods by the deployment into said space of at least one retractable bulk container stored adjacent the roof of said vehicle, the improvement comprising:

at least two hoisting lines connected to said at least one bulk container, one of said at least two hoisting lines running along one side wall of said cargo space to an end wall of said cargo space, and the other of said at least two hoisting lines running along an opposite side wall of said cargo space to said end wall of said cargo space; and means for drawing and releasing said at least two hoisting lines so as to retract and deploy said at least one bulk container within said cargo space.

2. In a freight vehicle according to claim 1, wherein said means for drawing and releasing comprises a winding reel mounted on a winding shaft, and a motor for rotating said winding shaft in one direction to draw said hoisting lines, and rotating said winding shaft in an opposite direction to release said hoisting lines.

3. In a freight vehicle according to claim 2, wherein said motor is coupled directly to said winding shaft.

4. In a freight vehicle according to claim 2, wherein said motor is coupled to said winding shaft via a gear shaft.

5. In a freight vehicle according to claim 2, wherein said motor is an electric motor.

6. In a freight vehicle according to claim 2, wherein said motor is a hydraulic motor.

7. In a freight vehicle according to claim 1, wherein said means for drawing and releasing comprises a ram assembly mounted externally of said freight vehicle, including a ram connected to said hoisting lines, said ram being movable within a housing to draw and release said hoisting lines back and forth.

8. In a freight vehicle according to claim 7, wherein said ram is operated using hydraulics.

9. In a freight vehicle according to claim 7, wherein said ram is operated using pneumatics.

10. In a freight vehicle according to claim 7, wherein said at least one bulk container is a bulk cargo bag.

11. In a freight vehicle according to claim 1, wherein said drawing and releasing means is adjacent to said end wall.

12. A system for raising and lowering a cargo holder within a cargo space of an enclosed freight carrying vehicle having a fixed floor, comprising:

a reciprocating ram assembly mounted on said vehicle;

at least one hoisting line connected at one end thereof to said reciprocating ram assembly, and connected at another end thereof to said cargo holder; and means for operating said ram assembly so as to reciprocate said hoisting line between a raising position and a lowering position for respectively raising and lowering said cargo holder, wherein said cargo holder is a bulk cargo container bag.

13. A system for raising and lowering a cargo holder within a freight carrying vehicle according to claim 12, wherein said vehicle is a tractor-trailer.

14. A system for raising and lowering a cargo holder within a freight carrying vehicle according to claim 12, wherein said hoisting line is a chain.

15. A system for raising and lowering a cargo holder within a freight carrying vehicle according to claim 12, wherein said hoisting line is a cable.

16. A system for raising and lowering a cargo holder within a freight carrying vehicle according to claim 12, wherein said operating means is a hydraulic system.

17. A system for raising and lowering a cargo holder within a freight carrying vehicle according to claim 12, wherein said operating means is a pneumatic system.

18. A system for raising and lowering a cargo holder within a freight carrying vehicle according to claim 12, wherein said reciprocating ram assembly is mounted externally of said cargo space.

* * * * *